(12) United States Patent
Kwon et al.

(10) Patent No.: US 11,407,041 B2
(45) Date of Patent: Aug. 9, 2022

(54) LONG HOLE SAW FOR COMPOSITE MATERIAL INSULATION PANEL

(71) Applicant: KOREA FA INDUSTRIAL CO., LTD, Gwangju-Si (KR)

(72) Inventors: Jong-Kil Kwon, Seongnam-Si (KR); Yun-Jeong Choi, Seongnam-Si (KR); In Kwon, Seongnam-Si (KR); Jin Kwon, Seongnam-Si (KR); Hyeon Kwon, Seongnam-Si (KR)

( * ) Notice: Subject to any disclaimer, the term of this patent is extended or adjusted under 35 U.S.C. 154(b) by 0 days.

(21) Appl. No.: 17/042,206

(22) PCT Filed: Mar. 15, 2019

(86) PCT No.: PCT/KR2019/003019
§ 371 (c)(1),
(2) Date: Sep. 28, 2020

(87) PCT Pub. No.: WO2019/194431
PCT Pub. Date: Oct. 10, 2019

(65) Prior Publication Data
US 2021/0023631 A1     Jan. 28, 2021

(30) Foreign Application Priority Data

Apr. 3, 2018   (KR) .................. 10-2018-0038639

(51) Int. Cl.
*B23B 51/04*     (2006.01)
(52) U.S. Cl.
CPC ...... *B23B 51/0473* (2013.01); *B23B 51/0426* (2013.01); *B23B 2250/04* (2013.01)

(58) Field of Classification Search
CPC ............ B23B 51/0406; B23B 51/0426; B23B 2251/60; B23B 2251/285; B23B 51/0473;
(Continued)

(56) References Cited

U.S. PATENT DOCUMENTS

| | | | | |
|---|---|---|---|---|
| 5,076,741 A | * | 12/1991 | Littlehorn | B23B 51/0453 408/68 |
| 5,624,213 A | * | 4/1997 | Anderson | B23B 51/0473 144/23 |
| 5,803,678 A | * | 9/1998 | Korb | B23B 51/0426 408/206 |

(Continued)

FOREIGN PATENT DOCUMENTS

| | | |
|---|---|---|
| JP | 06-034890 | 9/1994 |
| JP | 4815137 | 11/2011 |

(Continued)

OTHER PUBLICATIONS

English Specification of 4815137.

(Continued)

*Primary Examiner* — Chwen-Wei Su
(74) *Attorney, Agent, or Firm* — Antonio Ha & U.S. Patent, LLC (57) ABSTRACT

The present invention relates to a long hole saw for a composite material insulation panel for easily cutting a steel sheet of a hard material and a heat insulator such as Styrofoam or urethane of a soft material in one direction, wherein it is possible to reduce shaking vibrations generated during the cutting and to easily, precisely, and stably drill holes when drilling holes for the installation of pipes, conduits, etc. into a composite material insulation panel used for wall or roof construction of a building.

6 Claims, 7 Drawing Sheets

(58) Field of Classification Search
CPC ............ B23B 51/0413; B23B 2250/04; B26D 7/2614
See application file for complete search history.

(56) References Cited

U.S. PATENT DOCUMENTS

| | | | | |
|---|---|---|---|---|
| 5,813,802 | A * | 9/1998 | Ajimi | B23B 51/0426 |
| | | | | 175/403 |
| 6,588,992 | B2 * | 7/2003 | Rudolph | B23B 51/04 |
| | | | | 408/204 |
| 7,658,576 | B1 * | 2/2010 | Buzdum | B23B 51/0453 |
| | | | | 408/204 |
| 2017/0252834 | A1 * | 9/2017 | Spera | B23B 51/0426 |

FOREIGN PATENT DOCUMENTS

| | | |
|---|---|---|
| KR | 10-0421440 | 3/2004 |
| KR | 10-0610886 | 8/2006 |
| KR | 10-0881060 | 1/2009 |
| KR | 10-1501367 | 3/2015 |

OTHER PUBLICATIONS

English Specification of 10-0610886.
English Specification of 06-034890.
English Specification of 10-1501367.
English Specification of 10-0881060.
English Specification of 10-0421440.

* cited by examiner

FIG. 1

PRIOR ART

FIG. 2

PRIOR ART

LONG HOLE SAW FOR COMPOSITE MATERIAL INSULATION PANEL

TECHNICAL FIELD

The present invention relates to a long hole saw for an insulated composite panel, and more particularly, to a long hole saw for an insulated composite panel that is capable of easily cutting in one direction the insulated composite panel used to construct a wall body or roof of a building, which is constituted of a steel plate as a hard material and Styrofoam or urethane as a soft material, upon punching a hole onto the insulated composite panel so as to install a pipe, a steel pipe, or the like on the insulated composite panel, and that is capable of reducing shakes and vibrations generated during the cutting, thereby making it possible to perform the hole punching work easily, accurately, and stably.

BACKGROUND ART

Under government plan for energy saving effects of a building, recently, an insulation system for internal and external walls of the building has been positively introduced at the time when the building is designed or constructed.

Generally, a sandwich panel as an insulated composite panel with a thickness in the range of 150 to 300 mm has been chiefly used as an insulation material for the exterior of the building.

The sandwich panel is constituted of steel plates located on both surfaces thereof and Styrofoam or urethane bondedly filled between the steel plates.

So as to install a pipe, a ventilator path, a steel pipe, and the like onto a thick insulated composite panel used on a construction site, it is absolutely necessary to punch a hole onto the thick insulated composite panel on the construction site.

Figure 1:
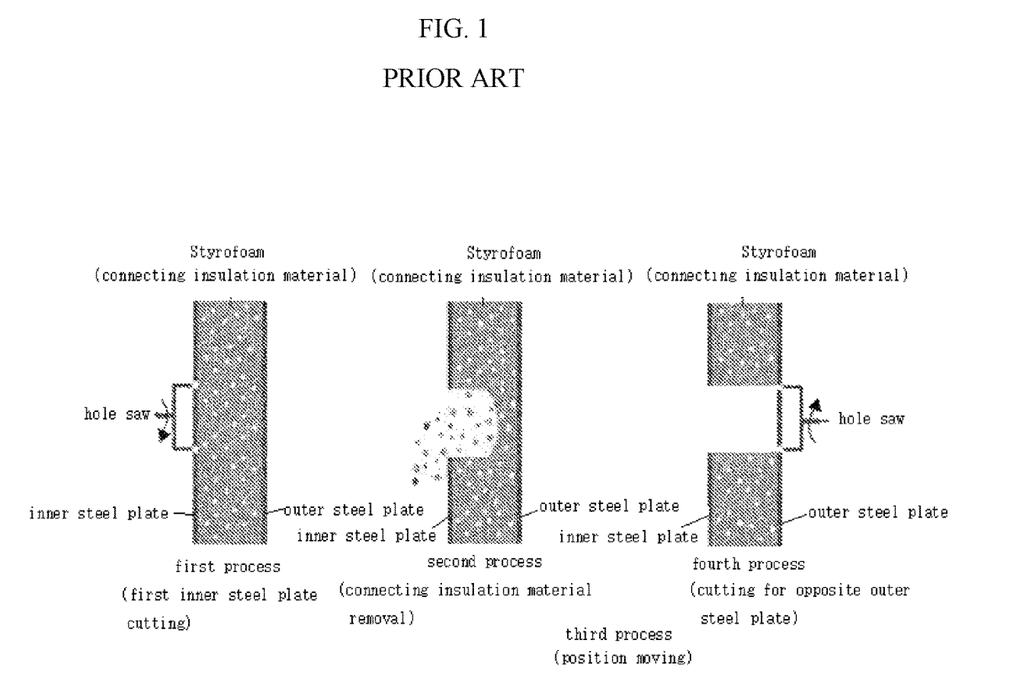
FIG. 1 is a sectional view showing a procedure for punching a hole onto an insulated composite panel in a conventional practice.

A current procedure for punching the hole onto the insulated composite panel on the construction site has first to fourth processes as shown in FIG. 1.

At the first process, a hole is punched onto an inner steel plate, and at the second process, Styrofoam or urethane as a soft material is removed. At the third process, next, a working position is moved to the outside, and at the fourth process, a hole is formed onto an outer steel plate, thereby finishing the hole punching work through total four processes. After the inner steel plate has been punched, in this case, the working position has to be moved to the outside to punch the hole onto the outer steel plate, so that the hole punching work is performed inconveniently two times.

Figure 2:
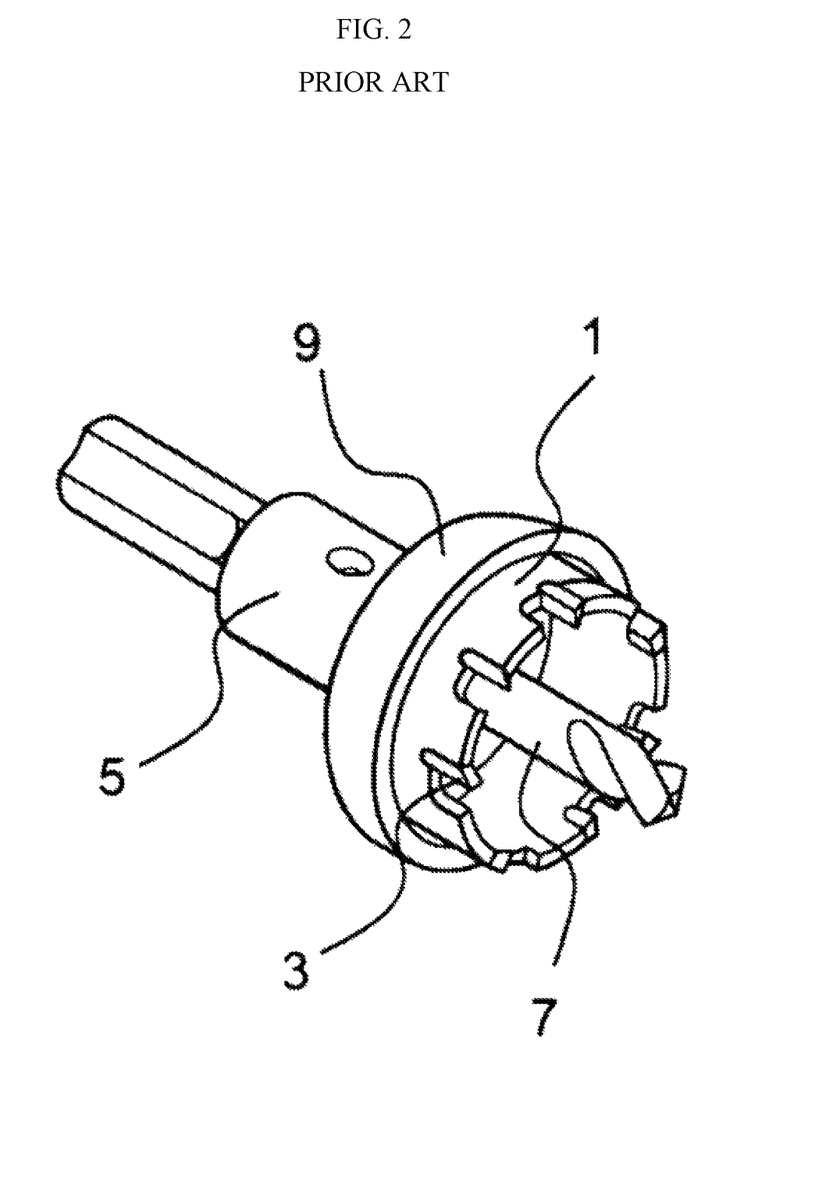
FIG. 2 is a schematic view showing a conventional hole cutter.

So as to perform hole punching onto the insulated composite panel as mentioned above, further, a conventional hole cutter is disclosed in Korean Patent No. 10-0421440 wherein, as shown in FIG. 2, the hole cutter includes: a cutting body having a hollow cylindrical container formed by means of drawing of a circular steel plate, a cavity whose inner periphery is female-screwed formed on a bottom surface of the hollow container, and a plurality of cutting tip seating grooves formed an end edge periphery of the hollow container; a plurality of cutting tips bondedly seated onto the plurality of cutting tip seating grooves; a drill holder whose one end portion is formed as a sank coupled to a drill chuck and the other end portion has a male screw formed on an outer peripheral surface thereof in such a manner as to be coupled to the cavity of the cutting body; a drill blade fittedly fixed to the center of the other end portion of the drill holder; and an insertion prevention cap covered on the bottom surface of the cutting body in such a manner to protrude from the outer edge periphery of the cutting body and to be fittedly fixed to the other end portion of the drill holder.

The conventional hole cutter generates shakes and vibrations due to a rotary force thereof upon hole punching onto the steel plate as well as a frictional force caused upon cutting, and so as to minimize the shakes and vibrations upon the rotation, accordingly, a vertically pressurized load has to be sufficiently and stably applied to the drill blade as a center rotation shaft with a larger force than the cutting and frictional forces. According to the conventional hole cutter, however, the drill blade as the center rotation shaft has a straight body whose upper and lower diameters are the same as each other, so that upon the rotation of the cutting body, the drill blade cannot receive the vertically pressurized load sufficiently, and shakes and vibrations are generated from the drill blade as the center rotation shaft to cause a center hole of the steel plate to be undesirably enlarged. Due to the enlargement of the center hole, the shakes and vibrations are more seriously generated from the drill blade as the center rotation shaft, and as a result, the drill blade may be broken, thereby making it impossible to perform the hole punching. Besides, the drill blade may be easily abraded or damaged due to frequent frictional forces between the drill blade and the steel plate.

In addition, the cutting body of the conventional hole cutter is short in length so that upon the hole punching, it is moved to the interior and exterior to punch the holes over two times. Accordingly, degrees of concentricity between the internal and external holes on the steel plates often do not correspond to each other, so that it is impossible to perform the installation of a pipe, which inconveniently causes additional work for enlarging the holes.

On the other hand, many difficulties have been caused due to the above-mentioned problems on the hole punching work for the rear plate of the insulated composite panel on the current construction site, and accordingly, there is a definite need to simultaneously satisfy cutting conditions of two kinds of different material properties of the insulated composite panel, that is, a steel plate with strong properties and Styrofoam or urethane as a soft material weak in heat, so that the hole punching work is conveniently performed only in one direction.

DISCLOSURE

Technical Problem

Accordingly, the present invention has been made in view of the above-mentioned problems occurring in the related art, and it is an object of the present invention to provide a long hole saw for an insulated composite panel that is capable of allowing cutting blades for a hard material and cutting blades for a soft material to be located differently on a cylindrical body so as to cut a steel plate as the hard material and Styrofoam or urethane as the soft material of the insulated composite panel, thereby easily and quickly cutting the hard material and causing no melting during the cutting of the soft material.

It is another object of the present invention to provide a long hole saw for an insulated composite panel that is capable of allowing a conical pressurizing portion to be formed on a lower periphery of a balancing support part as a center rotation shaft of a cylindrical body so as to increase a surface contact with a steel plate as an object to be cut, so that as a center hole is not secondarily cut, no enlargement in a diameter of the center hole occurs, and as the pressurizing portion has a surface contact with the center hole, the balancing support part can maintain the line of the center rotation shaft to allow the center of rotation to be firmly and stably kept even under strong shakes and vibrations during the rotating and cutting, thereby accurately and stably performing the hole punching work.

Technical Solution

To accomplish the above-mentioned objects, according to the present invention, there is provided a long hole saw for an insulated composite panel, including: a cutting part provided with a cylindrical body whose interior is hollow having a threaded through hole formed on a center of top thereof, a plurality of first cutting blades equally spaced apart from each other on a lower end periphery of the cylindrical body in a circumferential direction of the cylindrical body, and a plurality of second cutting blades equally spaced apart upward from the plurality of first cutting blades by a given height in the circumferential direction of the cylindrical body in such a manner as to allow a lower portion to be diagonally cut in a reverse rotating direction and to thus protrude inward from the cylindrical body; and a balancing support part provided with a coupling rod having a screw thread formed on a lower side periphery thereof in such a manner as to be screw-coupled to the through hole of the cylindrical body, a support extended downward from the coupling rod by a given length and having a pressurizing portion formed on a lower end periphery thereof in such a manner as to be reduced in diameter like a conical shape, and a drill with a given length disposed on a lower end periphery of the pressurizing portion.

Advantageous Effects

According to the present invention, the long hole saw for the insulated composite panel can minimize the bending moment value by means of the balancing support part, thereby suppressing up, down, left and right vibrations, maintaining center of rotation firmly and stably, performing hole punching work stably and accurately, sufficiently applying a cutting load in a vertically downward direction, increasing a cutting speed of a steel plate, and enhancing work efficiency.

In addition, the long hole saw for the insulated composite panel according to the present invention can form a conical center hole onto a thin steel plate by means of the conical pressurizing portion of the balancing support part to allow a surface contact between the steel plate and the balancing support part to be increasingly carried out, thereby resisting strong shakes and vibrations caused by means of rotating and cutting, and to also allow the cut steel plate through the deformation of the center hole to the shape of cone to be naturally separated from the cylindrical body, without entering the interior of the cylindrical body, thereby easily performing the separation of the cut steel plate from the long hole saw.

Moreover, the long hole saw for the insulated composite panel according to the present invention is configured to have the entire body longer than that of the conventional hole saw and to allow the cutting blades for the soft and hard materials of the insulated composite panel to be formed differently from each other, so that it is possible to easily cut even the thick insulated composite panel with a thickness larger than 150 mm within one minute in one direction, thereby greatly shortening the work time for the hole punching and enhancing work efficiency.

MODE FOR INVENTION

According to the present invention, a long hole saw for an insulated composite panel includes: a cutting part 10 provided with a cylindrical body 11 whose interior is hollow having a threaded through hole 110 formed on a center of top thereof, a plurality of first cutting blades 12 equally spaced apart from each other on a lower end periphery of the cylindrical body 11 in a circumferential direction of the cylindrical body 11, and a plurality of second cutting blades 13 equally spaced apart upward from the plurality of first cutting blades 12 by a given height in the circumferential direction of the cylindrical body 11 in such a manner as to allow a lower portion to be diagonally cut in a reverse rotating direction and to thus protrude inward from the cylindrical body 11; and a balancing support part 20 provided with a coupling rod 21 having a screw thread formed on a lower side periphery thereof in such a manner as to be screw-coupled to the through hole 110 of the cylindrical body 11, a support 22 extended downward from the coupling rod 21 by a given length and having a pressurizing portion 220 formed on a lower end periphery thereof in such a manner as to be reduced in diameter like a conical shape, and a drill 23 with a given length disposed on a lower end periphery of the pressurizing portion 220.

Further, the cylindrical body 11 has a plurality of body holes 14 equally spaced apart from each other on an outer periphery of an intermediate portion thereof in the circumferential direction thereof, and the body holes 14 are formed on $\frac{1}{10}$ to $\frac{9}{10}$ of the entire area of the cylindrical body 11.

Furthermore, the support 22 is more enlarged in diameter than the coupling rod 21, and as the coupling rod 21 is screw-coupled to the through hole 110 inside the cylindrical body 11, the screw thread formed on the coupling rod 21 has a spiral direction opposite to a cutting rotation direction of the cylindrical body 11.

Moreover, the second cutting blades 13 are equally spaced apart from each other with 3 to 6 times longer distance than the distance among the first cutting blades 12 on the cylindrical body 11.

Further, the cylindrical body 11 and the support 22 have the same length in the range of 80 to 350 mm length as each other, and a ratio of a length of the support 22 to a diameter of the support 22 is 1:0.1 to 0.3.

So as to allow the cutting part 10 to be firmly coupled to the balancing support part 20, furthermore, the balancing support part 20 is coupled to the cylindrical body 11 toward an upward direction of the cylindrical body 11 from the underside of the cylindrical body 11, and a nut 30 is screw-coupled to the coupling rod 21 on top of the cylindrical body 11.

Hereinafter, the long hole saw for an insulated composite panel according to the present invention will be in detail explained with reference to the attached drawings.

Figure 3:
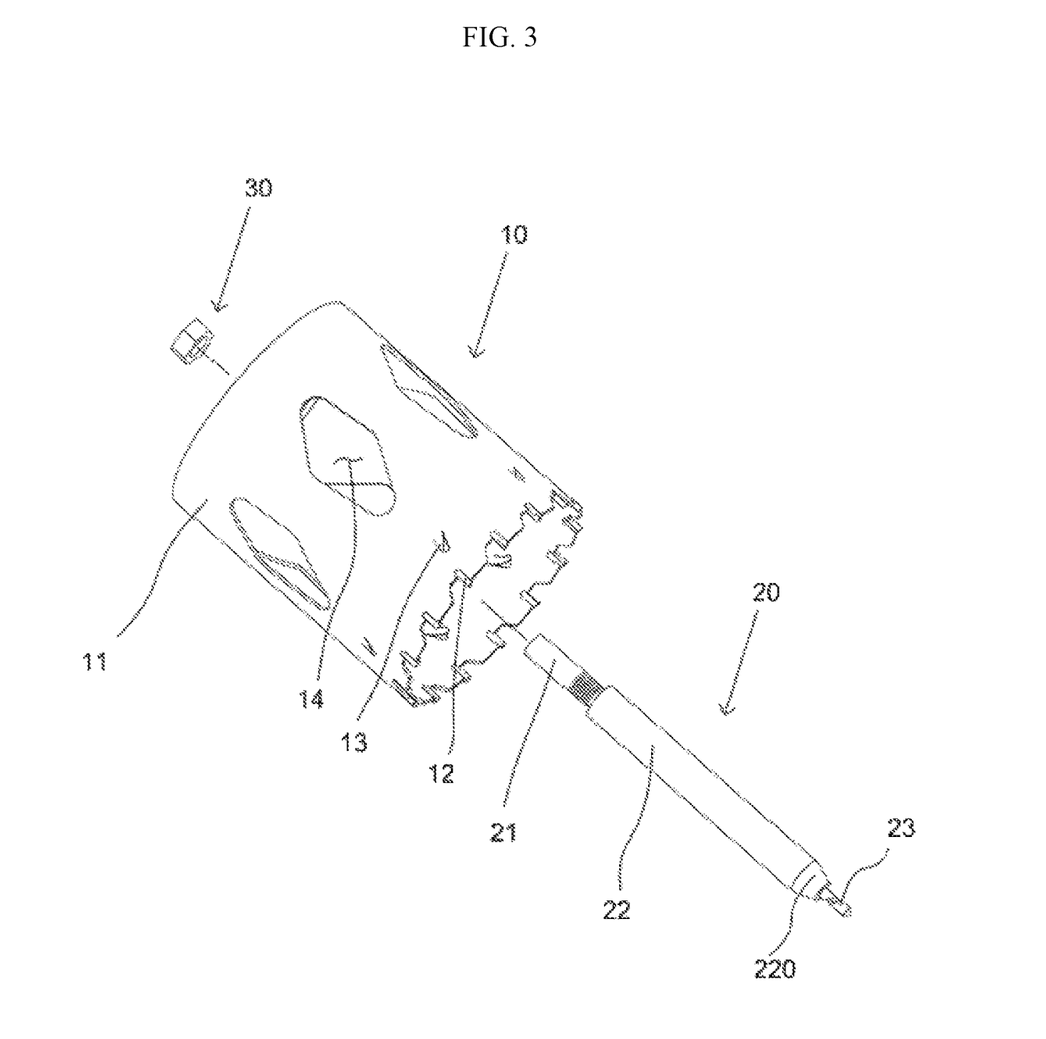
FIG. 3 is an exploded perspective view showing a long hole saw according to the present invention.
Figure 4:
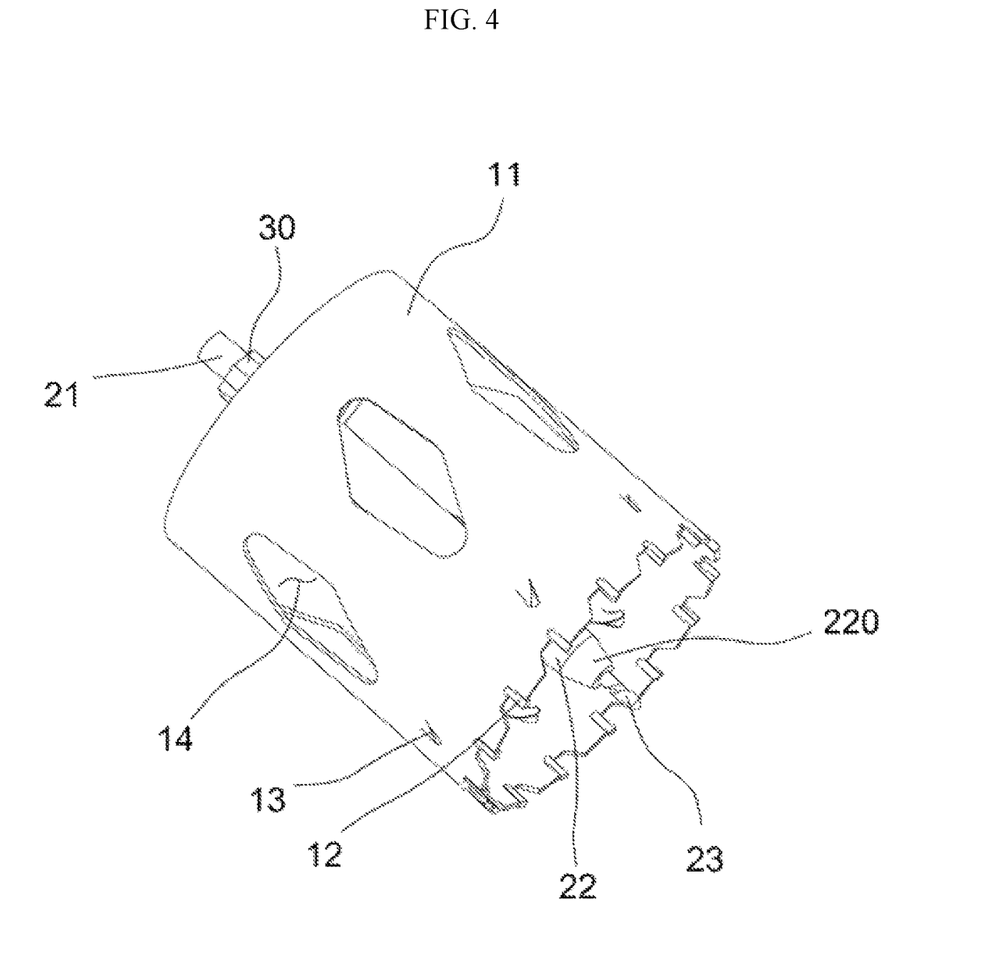
FIG. 4 is a perspective view showing the long hole saw according to the present invention.
Figure 5:
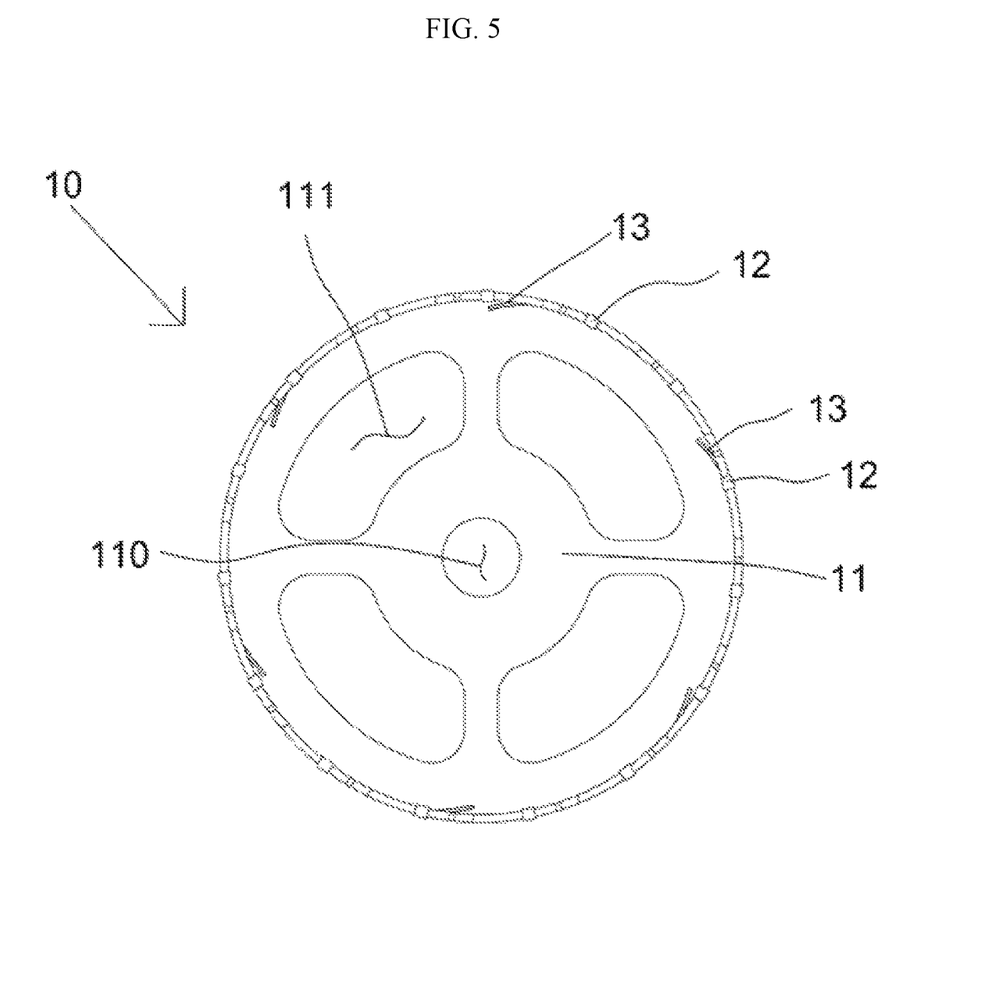
FIG. 5 is a bottom view showing a cutting part of the long hole saw according to the present invention.
Figure 6:
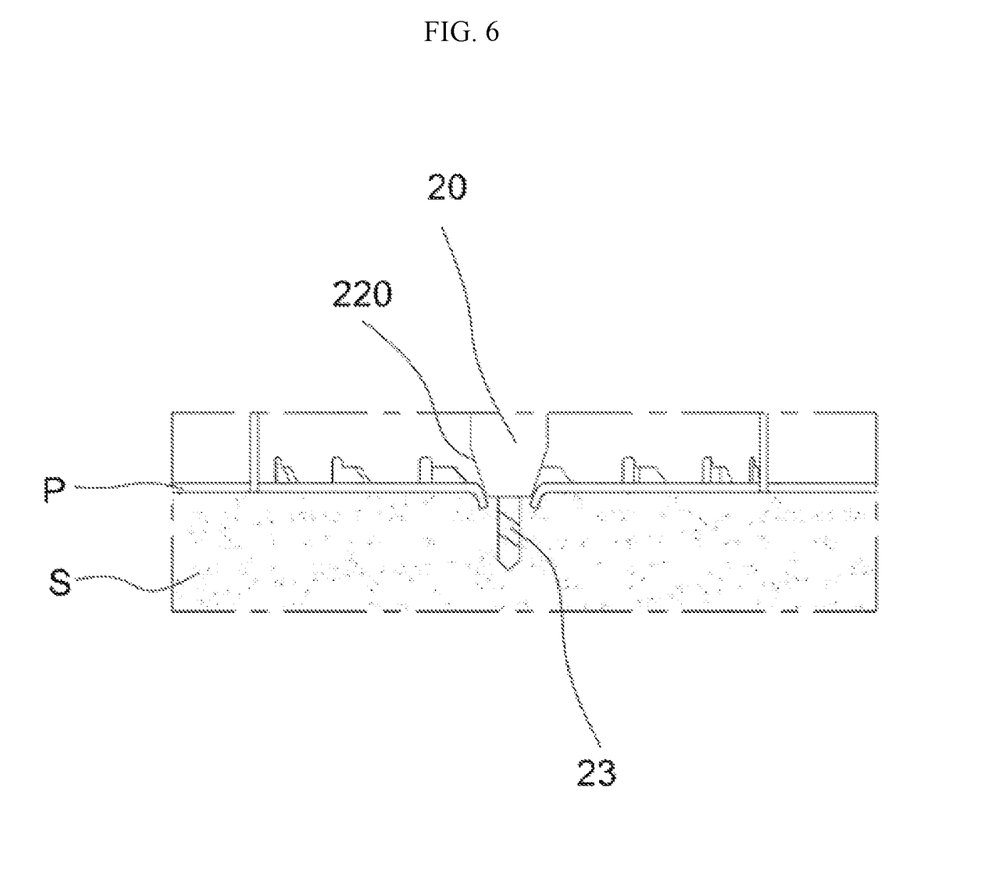
FIG. 6 is a sectional view showing an operating effect of a pressurizing portion of the long hole saw according to the present invention.
Figure 7:
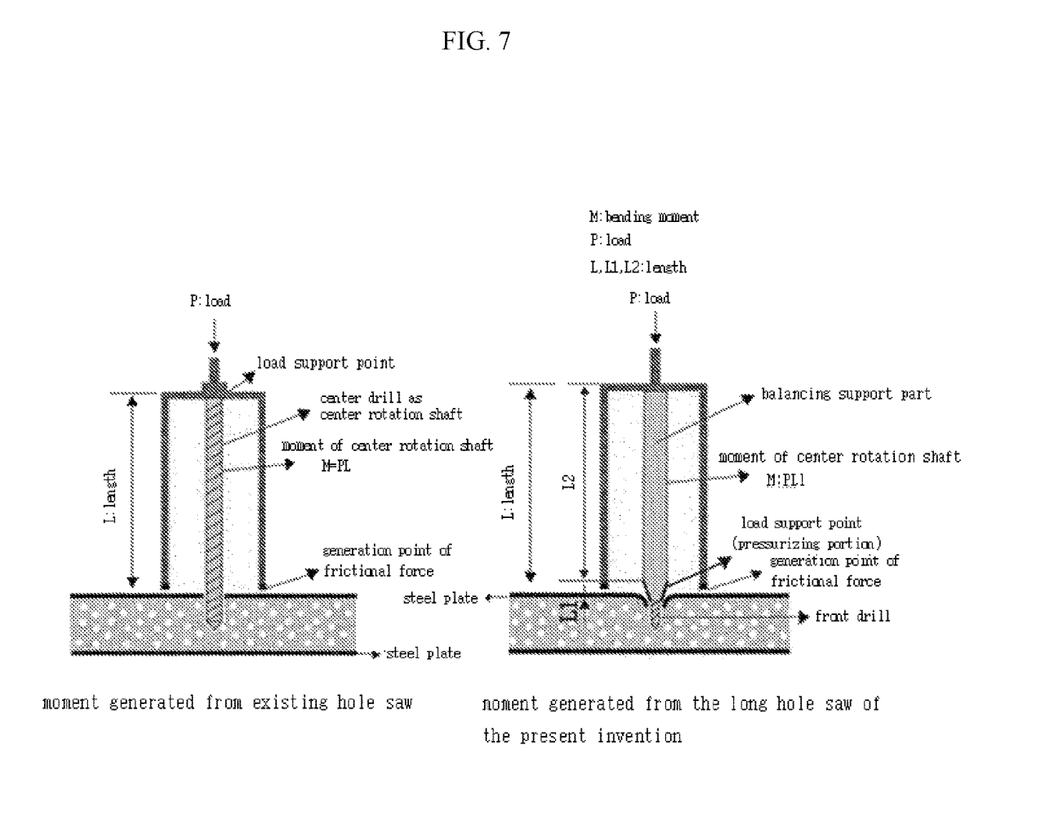
FIG. 7 is a sectional view showing a comparison result of a moment generated from a balancing support part of the long hole saw according to the present invention and a moment generated from the existing hole saw.

FIG. 1 is a sectional view showing a procedure for punching a hole on an insulated composite panel in a conventional practice, FIG. 2 is a schematic view showing a conventional hole cutter, FIG. 3 is an exploded perspective view showing a long hole saw according to the present invention, FIG. 4 is a perspective view showing the long hole saw according to the present invention, FIG. 5 is a bottom view showing a cutting part of the long hole saw according to the present invention, FIG. 6 is a sectional view showing an operation effect of a pressurizing portion of the long hole saw according to the present invention, and FIG. 7 is a sectional view showing a comparison result of a moment generated from a balancing support part of the long hole saw according to the present invention and a moment generated from the existing hole saw.

As shown in FIGS. 3 and 4, the long hole saw according to the present invention is used to punch a hole for installing a pipe, a ventilator path, a steel pipe, and so on onto an insulated composite panel (sandwich panel), which is prefabricated for a wall body or roof of a building, and according to the present invention, the long hole saw is configured to have the cutting part 10 for cutting the panel to a circular form and the balancing support part 20 coupled to the cutting part 10 and serving as a center rotation shaft of the cutting part 10 to thus support the cutting part 10.

The cutting part 10 is provided with the hollow cylindrical body 11 open on a bottom surface thereof, the first cutting blades 12 formed on the cylindrical body 11 to cut a steel plate P made of a hard material, and the second cutting blades 13 adapted to cut Styrofoam or urethane S made of a soft material.

The cylindrical body 11 whose bottom surface is open is hollow in an interior thereof and has the threaded through hole 110 formed on the center of top thereof in such a manner as to be coupled to the balancing support part 20 and the body holes 14 equally spaced apart from each other on the outer periphery of the intermediate portion thereof in the circumferential direction thereof.

When considering that the insulated composite panel has a thickness of 80 mm for an inner wall and a thickness of 150 mm or above for an outer wall, generally, the cylindrical body 11 desirably has a length of 80 to 350 mm so that cutting for forming a hole on the insulated composite panel can be easily performed in one direction.

On the other hand, as shown in FIG. 5, the cylindrical body 11 has a plurality of through holes 111 formed on top thereof around the through hole 110 in such a manner as to allow cut Styrofoam or urethane materials or fine cut particles accommodated therein to be discharged therethrough.

The first cutting blades 12 are equally spaced apart from each other on the lower end periphery of the cylindrical body 11 in the circumferential direction of the cylindrical body 11 so as to cut the steel plate as the hard material among the insulated composite panel, and the first cutting blades 12 are configured to have a plurality of cutting tip seating grooves equally spaced apart from each other on the lower end periphery of the cylindrical body 11 and cutting tips bondedly seated onto the cutting tip seating grooves. Otherwise, they may have shapes of a plurality of teeth, but they are not limited in shape because they are not critical components of the present invention.

The second cutting blades 13 are equally spaced apart upward from the plurality of first cutting blades 12 by the given height in the circumferential direction of the cylindrical body 11 so as to cut Styrofoam or urethane as the soft material among the insulated composite panel, and as shown in FIG. 5, the lower portions of the second cutting blades 13 are diagonally cut in a reverse rotating direction of the cylindrical body 11 in such a manner as to protrude inward from the cylindrical body 11. Accordingly, chips generated upon cutting of the Styrofoam or urethane can be discharged well from through holes formed by means of the cutting and protruding of the second cutting blades 13, and also, frictional heat generated from the soft material like the Styrofoam or urethane can be reduced by the through holes formed by means of the cutting and protruding of the second cutting blades 13.

Further, the first cutting blades 12 and the second cutting blades 13 are equally spaced apart from each other on the cylindrical body 11, and in this case, desirably, the second cutting blades are equally spaced apart from each other on the cylindrical body 11 with 3 to 6 times longer distance than the distance among the first cutting blades 12. When the number of first cutting blades 12 is large and rotating speeds of the first cutting blades 12 are fast, it is possible to cut the steel plate as the hard material, but as the Styrofoam or urethane as the soft material is made of a petrochemical product, unfortunately, it may easily melt by heat. So as to cut the Styrofoam or urethane as the soft material, accordingly, the second cutting blades 13 are equally spaced apart from each other on the cylindrical body 11 with 3 to 6 times longer distance than the distance among the first cutting blades 12, so that the number of second cutting blades 13 is small and rotating speeds of the second cutting blades 13 are decreased, thereby reducing the frictional heat generated upon cutting to the maximum and preventing melting caused by the frictional heat.

The body holes 14 are penetrated to shapes of polygons, diamonds, circles, or the like into the outer periphery of the intermediate portion of the cylindrical body 11 in the circumferential direction of the cylindrical body 11, and they are formed on ⅒ to 9/10 of the entire area of the cylindrical body 11, so that they serve as spaces through which the cut particles like the Styrofoam or urethane entering the interior of the cylindrical body 11 are discharged to the outside to allow the cut fine particles existing inside the cylindrical body 11 to be rapidly discharged to the outside therethrough. Also, the body holes 14 minimize surface contacts between the cylindrical body 11 and the soft material to allow frictional resistance and heat therebetween to be reduced, thereby preventing melting caused by the frictional heat of the fine soft material particles and achieving gentle cutting of the soft material.

The balancing support part 20 is coupled to the cutting part 10 and thus serves as a center rotation shaft so that it punches a center hole onto the insulated composite panel, firmly supports the cutting part 10, minimizes a bending moment value of the center rotation shaft to suppress shakes and vibrations during the cutting process and also to apply a stable vertical load. To do this, the balancing support part 20 includes the coupling rod 21 coupled to the cylindrical body 11, the support 22 extended downward from the lower end periphery of the coupling rod 21 by the given length and having the pressurizing portion 220 formed on the lower end periphery thereof, and the drill 23 with the given length disposed on the lower end periphery of the support 22 to punch the center hole on the insulated composite panel.

The coupling rod 21 is a connector to which an electric motor (not shown) is connected to transfer rotary power for rotating the balancing support part 20 and the cylindrical body 11, and accordingly, the coupling rod 21 is extended with a given length and has a screw thread formed on a lower outer periphery thereof in such a manner as to correspond to an inner periphery of the through hole 110, so that the coupling rod 21 is firmly screw-coupled to the through hole 110 of the cylindrical body 11.

When the screw thread formed on the coupling rod 21 is screw-coupled to the through hole 110 of the cylindrical body 11, in this case, it is coupled to the through hole 110 from the inner lower portion of the cylindrical body 11 toward the top of the cylindrical body 11, and further, the screw thread has a spiral direction opposite to a cutting rotation direction of the cylindrical body 11, so that when the cutting part 10 cuts the insulated composite panel as an object to be cut, the balancing support part 20 can be firmly coupled to the cylindrical body 11, without being easily unfastened from the through hole 110. According to the present invention, the rotation direction of the cutting part 10 is right, and accordingly, desirably, the cylindrical body 11 and the coupling rod 21 are fastened to each other in a left-handed direction.

The support 22 is extended from the lower end periphery of the coupling rod 21 with the same length as the diameter of the lower periphery of the cylindrical body 11 in such a manner as to be more enlarged in diameter than the coupling rod 21, and further, the support 22 has the pressurizing portion 220 reduced in diameter to the shape of the cone to achieve the surface contact with the steel plate P.

The pressurizing portion 220 is reduced in diameter to the shape of the cone, and during the hole punching, accordingly, the steel plate P around the center hole has a surface with the conical pressurizing portion 220 after the center hole has been punched onto the steel plate P of the insulated composite panel by means of the drill 23, so that the steel plate P stably receives the vertically pressurized load to the maximum, thereby greatly suppressing the shakes and vibrations generated in every direction during the rotating and cutting process and achieving the rotating and cutting process in stable and accurate manners. After the center hole has been punched into the insulated composite panel by means of the drill 23 located on the lower end periphery of the pressurizing portion 220, the drill 23 does not come into contact with the steel plate P by means of the pressurizing portion 220, so that it cannot be damaged by means of the frictional force between the steel plate P and the drill 23.

Further, as shown in FIG. 6, if the vertically pressurized load is applied to the pressurizing portion 220, the thin steel plate P of less than 0.8 mm is deformed to the shape of a cone which is the same as the pressurizing portion 220, and accordingly, the surface contact between the thin steel plate P and the pressurizing portion 220 becomes large on the ground to sufficiently and stably apply the vertically pressurized load to the steel plate P. Further, the center hole in the middle portion of the steel plate P is deformed to the shape of the cone by means of the surface contact between the steel plate P and the pressurizing portion 220, and after cutting, the cutting part 10 is not fitted to the inside of the steel plate P, thereby allowing the cut steel plate P to be easily and safely separated from the cutting part 10.

Referring to the center rotation shaft in view of the principle of forces, two forces are basically generated from a shaft. In detail, a shear force and a bending moment are generated from a rotation shaft.

Almost all rotation shafts are weaker in the bending moments than the shear forces applied to the sections thereof, so that they may be broken out. Accordingly, it is important to minimize the bending moment so as to ensure the stability of the rotation shaft.

The balancing support part 20 as the center rotation shaft of the cutting part 10 adopts a cantilever beam under the principle of forces, and as appreciated from FIG. 7 showing bending moments, the center drill as the center rotation shaft of the existing hole saw has a straight type body whose upper and lower diameters are the same as each other, so that since a load support point P is formed on the top of the hole saw, which is distant by a length L from the steel plate as an object to be cut, a bending moment of the center rotation shaft is generated by the length L of the hole saw. Accordingly, the bending moment of the existing hole saw is M=PL.

To the contrary, a load support point P of the long hole saw according to the present invention is formed on the pressurizing portion 220 located on the lower periphery of the balancing support part 20, and accordingly, the bending moment of the balancing support part 20 is M=PL1. As a result, the balancing support part 20 of the long hole saw according to the present invention can have the bending moment more reduced by M=PL2 than the straight type center drill in the existing hole saw, and through the minimization of the bending moment, the long hole saw according to the present invention can ensure the stability of the center rotation shaft, thereby stably maintaining the line of the center rotation shaft, without any enlargement of the punched hole occurring from the straight type center drill of the existing hole saw.

Since the functions and operations of the center rotation shaft are very important in the long hole saw according to the present invention, the support 22 of the balancing support part 20 is extended to the same length as the cylindrical body 11 so as to ensure the stability of the bending moment and the shear force. In detail, a ratio of a length of the support 22 to a diameter of the support 22 is 1:0.1 to 0.3, so that a hole can be easily and quickly punched on the insulated composite panel with a thickness greater than 150 mm.

So as to more firmly couple the cutting part 10 to the balancing support part 20, under the above-mentioned configuration, the nut 30 is screw-coupled to the coupling rod 21 of the balancing support part 20 on top of the cylindrical body 11.

Hereinafter, an explanation on a process of punching a hole onto the insulated composite panel through the long hole saw for the insulated composite panel according to the present invention will be given.

The electric motor is connected to the long hole saw whose cutting part 10 and balancing support part 20 are coupled to each other, and next, the electric motor is driven to cut the inner steel plate as the hard material of the insulated composite panel.

If a hole is machined on the inner steel plate by means of the long hole saw, the electric motor is stopped, and next, the cut inner steel plate is first removed. In this case, the inner steel plate whose center hole is pressurized by the conical pressurizing portion 220 formed on the balancing support part 20 and thus has a surface contact with the pressurizing portion 220, and accordingly, the inner steel plate is deformed to the same conical shape as the pressurizing portion 220 and is thus cut through the hole machining. As a result, the steel plate accommodated into the cutting part 10 is automatically separated easily from the interior of the cutting part 10, thereby easily removing the cut inner steel plate.

After the inner steel plate has been cut and removed, the electric motor is driven again to cut the Styrofoam or urethane as a soft material of the insulated composite panel and to continuously cut the outer steel plate, so that the hole can be punched easily and quickly onto the insulated composite panel in one direction.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

It is therefore intended that the scope of the invention be limited not by this detailed description, but rather by the claims appended hereto.

The invention claimed is:

1. A long hole saw for an insulated composite panel, comprising:
    a cutting part (10) provided with a cylindrical body (11) whose interior is hollow having a threaded through hole (110) formed on a center of top thereof, a plurality of first cutting blades (12) equally spaced apart from each other on a lower end periphery of the cylindrical body (11) in a circumferential direction of the cylindrical body (11), and a plurality of second cutting blades (13) equally spaced apart upward from the plurality of first cutting blades (12) by a given height in the circumferential direction of the cylindrical body (11) in such a manner as to allow a lower portion of each of the plurality of the second cutting blades (13) to be diagonally cut on the cylindrical body (11) in a reverse rotating direction and to thus protrude inward from the cylindrical body (11); and
    a balancing support part (20) provided with a coupling rod (21) having a screw thread formed on a lower side periphery thereof in such a manner as to be screw-coupled to the through hole (110) of the cylindrical body (11), a support (22) extended downward from the coupling rod (21) by a given length and having a pressurizing portion (220) formed on a lower end periphery thereof in such a manner as to be reduced in diameter like a conical shape, and a drill (23) with a given length disposed on a lower end periphery of the pressurizing portion (220).

2. The long hole saw for an insulated composite panel according to claim 1, wherein the cylindrical body (11) has a plurality of body holes (14) equally spaced apart from each other on an outer periphery of an intermediate portion thereof in the circumferential direction thereof, and the body holes (14) are formed on $1/10$ to $9/10$ of an entire area of the cylindrical body (11).

3. The long hole saw for an insulated composite panel according to claim 1, wherein the support (22) is more enlarged in diameter than the coupling rod (21), and as the coupling rod (21) is screw-coupled to the through hole (110) inside the cylindrical body (11), the screw thread formed on the coupling rod (21) has a spiral direction opposite to a cutting rotation direction of the cylindrical body (11).

4. The long hole saw for an insulated composite panel according to claim 1, wherein the second cutting blades (13) are equally spaced apart from each other with 3 to 6 times longer distance than the distance among the first cutting blades (12) on the cylindrical body (11).

5. The long hole saw for an insulated composite panel according to claim 1, wherein the cylindrical body (11) and the support (22) have a same length in the range of 80 to 350 mm length as each other, and a ratio of a length of the support (22) to a diameter of the support (22) is 1:0.1 to 0.3.

6. The long hole saw for an insulated composite panel according to claim 1, wherein so as to allow the cutting part (10) to be firmly coupled to the balancing support part (20), the balancing support part (20) is coupled to the cylindrical body (11) toward an upward direction of the cylindrical body (11) from an underside of the cylindrical body (11), and a nut (30) is screw-coupled to the coupling rod (21) on top of the cylindrical body (11).

* * * * *